(12) United States Patent  
Wiese et al.

(10) Patent No.: US 8,701,920 B2
(45) Date of Patent: Apr. 22, 2014

(54) FUEL CAP

(75) Inventors: Richard W. Wiese, Highland, MI (US);
Jonathan J Stec, Milford, MI (US);
Timothy E. McCarthy, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 278 days.

(21) Appl. No.: 13/219,609

(22) Filed: Aug. 27, 2011

(65) Prior Publication Data

US 2013/0048639 A1 Feb. 28, 2013

(51) Int. Cl.
*B65D 51/16* (2006.01)

(52) U.S. Cl.
USPC ...................................... 220/295; 220/203.23

(58) Field of Classification Search
CPC ....................................................... F16J 13/24
USPC .................. 220/DIG. 33, DIG. 32, 86.2, 295, 220/203.26, 203.25, 203.23, 203.22, 220/203.19, 203.18, 203.14, 203.09, 220/203.01, 203.05, 203.24
See application file for complete search history.

(56) References Cited

U.S. PATENT DOCUMENTS

| 6,073,791 | A | * | 6/2000 | Reutter | 220/201 |
| 7,588,159 | B2 | * | 9/2009 | Otsuka | 220/304 |
| 2005/0011893 | A1 | * | 1/2005 | Reutter | 220/203.27 |
| 2011/0017734 | A1 | * | 1/2011 | Eggenreich et al. | 220/203.27 |

* cited by examiner

*Primary Examiner* — Mickey Yu
*Assistant Examiner* — Allan Stevens

(57) ABSTRACT

A fuel cap for a filler neck on a fuel tank includes a cap body having threads for engaging the filler neck when the fuel cap is installed on the filler neck and a cap handle rotatably mounted on the cap body. A clutch acts between the cap handle and the cap body to permit the cap handle to rotate freely on the cap body when the clutch is disengaged. When the clutch is engaged, rotation of the cap handle will rotate the cap body so that the user can remove the fuel cap from the filler neck to refuel the vehicle. A pressure-sensing diaphragm disengages the clutch when the pressure differential between the fuel vapor pressure and the atmospheric pressure exceeds a predetermined threshold and engages the clutch when the pressure differential between the fuel vapor pressure and the atmospheric pressure is less than the predetermined threshold.

1 Claim, 2 Drawing Sheets

FUEL CAP

FIELD OF THE INVENTION

The present invention relates to a fuel cap for a motor vehicle and more particularly provides a fuel cap that cannot be removed while the fuel tank is pressurized.

BACKGROUND OF THE INVENTION

Modern motor vehicles, particularly hybrid vehicles, may utilize a sealed fuel system as a strategy to limit evaporative emissions. Once sealed, the fuel system is subject to internal pressure changes from changes in temperature. If the vehicle user removes the fuel cap while the system is pressurized, fuel vapor escapes into the atmosphere.

The prior art has proposed a system in which the vehicle user presses a button when the vehicle is to be refueled. Pressing the button initiates a process in which the fuel tank is depressurized by venting the fuel vapor pressure through a hydrocarbon capturing system so that fuel vapor is not vented into the atmosphere.

The prior art has also proposed that a latch be installed on the fuel filler door, and this latch will not release until the hydrocarbon capturing system has completed its process of depressurizing the fuel tank. After the fuel vapor pressure is relieved and reaches the same pressure as the atmosphere, the fuel filler door is unlocked, so that the user can open the fuel filler door and unscrew the fuel cap.

SUMMARY OF THE INVENTION

A fuel cap for a filler neck on a fuel tank includes a cap body having threads for engaging the filler neck when the fuel cap is installed on the filler neck and a cap handle rotatably mounted on the cap body. A clutch acts between the cap handle and the cap body to permit the cap handle to rotate freely on the cap body when the clutch is disengaged. When the clutch is engaged, rotation of the cap handle will rotate the cap body so that the user can remove the fuel cap from the filler neck to refuel the vehicle. A pressure-sensing diaphragm disengages the clutch when the pressure differential between the fuel vapor pressure and the atmospheric pressure exceeds a predetermined threshold and engages the clutch when the pressure differential between the fuel vapor pressure and the atmospheric pressure is less than the predetermined threshold.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
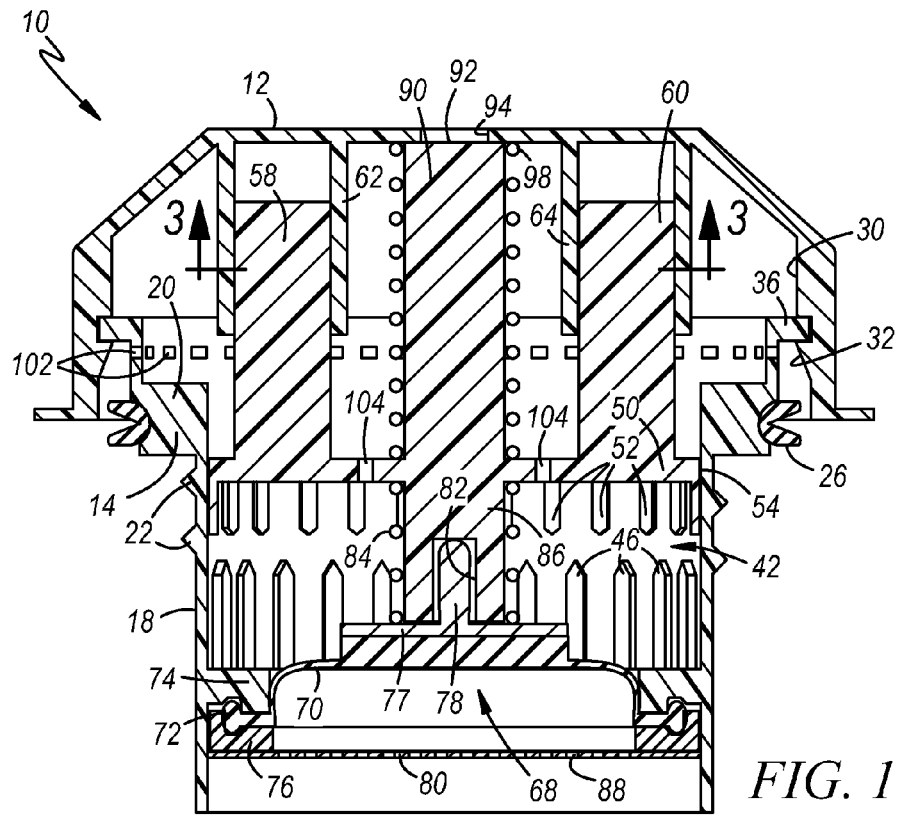
FIG. 1 is a section view taken through a fuel cap of this invention and showing a clutch that is disengaged so that rotation of the cap handle by the user cannot remove the fuel cap from the filler neck.

Referring to FIG. 1, a fuel cap, generally indicated at 10, is provided for closing a filler neck (not shown) on a vehicle fuel tank. The fuel cap 10 includes a handle 12 that is gripped by the user and a body 14 that threads into the fuel filler neck. As seen in FIG. 1, the body 14 is of molded plastic construction and generally tubular in shape including a tubular wall 18 with a flange 20 at the upper end thereof. Threads 22 are molded integrally on the outside of the tubular wall 18 to threadedly engage with the fuel filler neck when the body 14 is rotated with respect to the fuel filler neck. The flange 20 carries a flexible rubber seal 26 that will seal with the top surface of the fuel filler neck. The handle 12 is also of molded plastic construction and has a cylindrical sidewall 30 with a ramp surface 32 that will snap over a rim 36 molded on the flange 20 of the body 14 so that handle 12 is attached to the body 14 but the handle 12 is permitted to rotate freely relative to the body 14.

A clutch mechanism, generally indicated at 42, acts between the handle 12 and the body 14 to selectively clutch the handle 12 to the body 14, or unclutch the handle 12 from the body 14. Thus, when the clutch mechanism 42 is engaged, rotating the handle 12 will also rotate body 14. However, when the clutch mechanism 42 is disengaged, the handle 12 will freewheel relative the body 14 so that the vehicle user cannot remove the fuel cap 10 from the filler neck.

Figure 2:
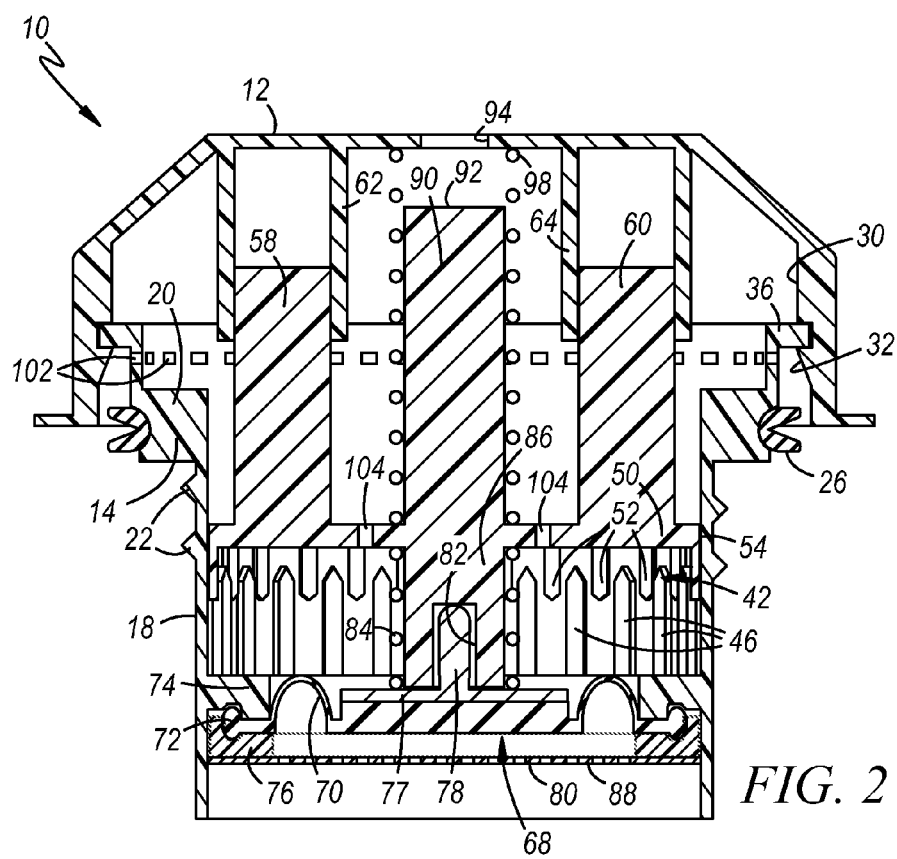
FIG. 2 is a section view similar to FIG. 1 but showing the clutch engaged so that rotation of the handle by the user will remove the fuel cap from the filler neck to permit refueling of the vehicle.
Figure 3:
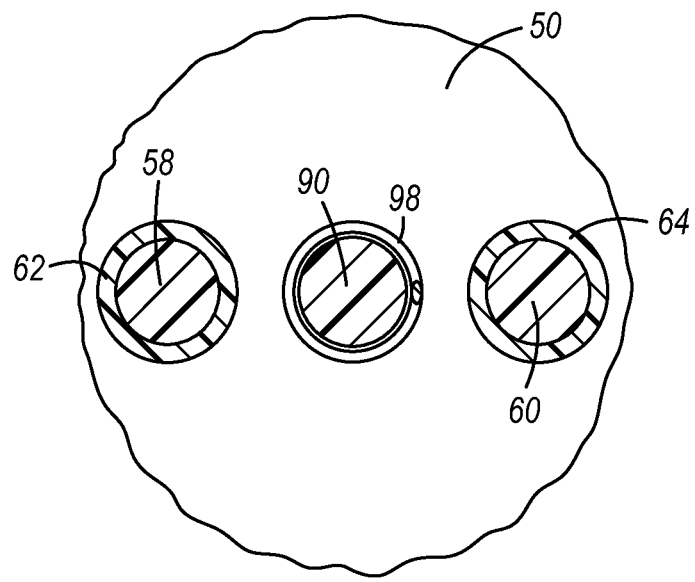
FIG. 3 is a section view taken in the direction of arrows 3-3 of FIG. 1.

The clutch mechanism 42 includes a plurality of clutch teeth 46 that are molded on the interior of the tubular wall 18 of the body 14. The clutch mechanism 42 also includes a clutch plate 50 that is movably mounted within the handle 12 and has a plurality of clutch teeth 52 molded thereon for engagement and disengagement with respect to the clutch teeth 46 of the body 14. The clutch plate 50 has an outer rim 54 that slides on the interior of the tubular wall 18 of the body 14. The clutch plate 50 also has a pair of guide pins 58 and 60 that extend upwardly from and closely captured respectively within tubular sleeves 62 and 64 that depend from the handle 12. The capture of the guide pins 58 and 60 within the tubular sleeves 62 and 64 connects the clutch plate 50 and the handle 12 in a manner by which the rotation of the handle 12 will always rotate the clutch plate 50, and the clutch plate 50 is allowed to move up and down within the handle 12. FIG. 1 shows the up position of the clutch plate 50 so that the clutch teeth 52 of the clutch plate 50 are spaced away from the clutch teeth 46 of the body 14. FIG. 2 shows the down position of the clutch plate 50 so that the clutch teeth 52 of the clutch plate 50 are engaged with the clutch teeth 46 of the body 14.

A diaphragm assembly, generally indicated at 68, is provided for moving the clutch plate 50 up and down to engage or disengage the clutch mechanism 42. As seen in FIG. 1, a flexible rubber diaphragm 70 is disk-shaped and has an outer rim 72 that is captured between an inward flange 74 on the interior of tubular wall 18 and a diaphragm retaining ring 76 that is press fit upwardly into the body 14. The center of the diaphragm 70 carries a stiffening plate 77 and a diaphragm guide pin 78. The diaphragm guide pin 78 is seated within a bore 82 provided within a support pin 86 that depends downwardly from the clutch plate 50. The guide pin 78 will guide the diaphragm 70 so that the diaphragm 70 will move up and down uniformly without wobbling. A coil compression spring 84 encircles the support pin 86 and acts between the clutch plate 50 and the diaphragm 70. A diaphragm stop plate 88 is press fit into the body 14 below the diaphragm 70 to limit the downward movement of the diaphragm 70. The diaphragm stop plate 88 has holes 80 therein so that vapor pressure within the fuel tank communicates with the underside of the diaphragm 70.

Figure 4:
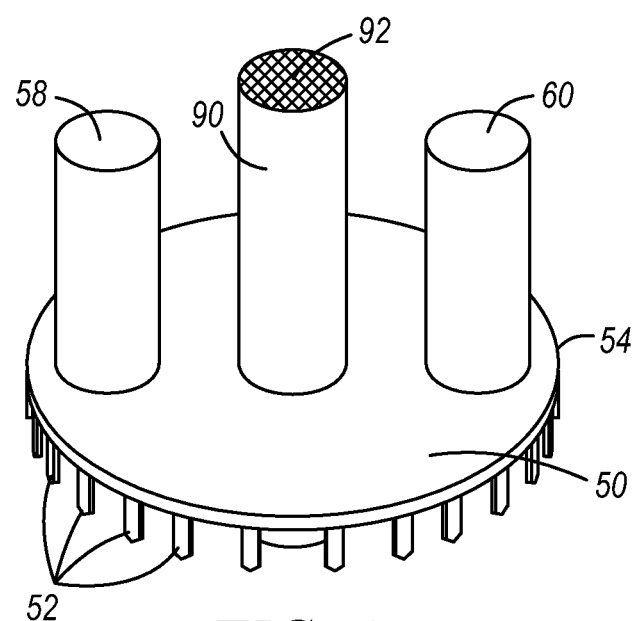
FIG. 4 is a perspective view of the clutch plate.

The clutch plate 50 has an indicator post 90 that extends upwardly from the clutch plate 50. As seen in FIG. 4, indicator post 90 has an indicator surface 92 that is preferably painted or otherwise treated to be highly visible through a window opening 94 provided in the top wall of the handle 12. A coil compression spring 98 encircles the indicator post 90 and acts between the handle 12 and the clutch plate 50 to urge the clutch plate 50 downwardly.

Operation

During normal operation of the vehicle, the fuel tank is pressurized and the pressure that exists within the fuel tank is greater than the ambient atmospheric pressure. The fuel vapor pressure within the fuel tank is communicating with the underside of the diaphragm 70. The upper side of the diaphragm 70 is exposed to the atmospheric pressure through vent passages including vent passages 102 in the body 14, vent passages 104 in the clutch plate 50, and also through the window opening 94.

In FIG. 1, the pressure within the fuel tank is acting upwardly on the diaphragm 70 and causing the diaphragm 70 to raise the clutch plate 50 to its position of FIG. 1 in which the clutch mechanism 42 is disengaged. The upward movement of the clutch plate 50 is limited by the engagement of the indicator post 90 with the inside of the handle 12. In this disengaged condition, the clutch teeth 52 of the clutch plate 50 are spaced away and disengaged from the clutch teeth 46 of the body 14. Accordingly, if the vehicle user attempts to rotate the handle 12 to remove the fuel cap 10, the handle 12 will rotate freely relative the body 14 and the body 14 will remain screwed to the fuel filler neck.

When the fuel tank is depressurized, typically by venting the fuel tank pressure through a hydrocarbon capturing system, the pressure within the fuel tank will become equalized or nearly equalized with the ambient atmospheric pressure. Accordingly, there is no longer a pressure differential acting on the pressure sensing diaphragm 70. The coil compression spring 98, acting downwardly on the clutch plate 50 will urge the clutch plate 50 and the diaphragm 70 downwardly so that the clutch teeth 52 of clutch plate 50 will become engaged with the clutch teeth 46 of the clutch body 14, as shown in FIG. 2. Thus, the clutch mechanism 42 is engaged and rotation of the handle 12 by the user will rotate the body 14 so that the threads 22 can become unscrewed from the filler neck to permit removal of the fuel cap 10 and refueling of the vehicle.

Referring again to FIG. 1, it will be understood that when the clutch mechanism 42 is disengaged, the clutch plate 50 is in the up position and the indicator post 90 is engaging with the handle 12 and the indicator surface 92 will be highly visible through the window opening 94 of the handle 12 so that the user will be informed that an attempt to unscrew the fuel cap 10 would be premature. Then, when the fuel pressure is relieved from the fuel tank, and the clutch plate 50 moves downwardly, the indicator surface 92 will withdraw from the window 94, thus indicating to the user that it is permissible to turn the handle 12 and remove the fuel cap 10 from the filler neck. If the user cannot wait for the fuel tank to become fully depressurized, an implement such as a key or screwdriver can be inserted through the window opening 94 to press downwardly on the indicator post 90 and thereby manually engage the clutch mechanism 42 as permitted by forcibly depressing the diaphragm 70 against whatever fuel pressure might remain in the fuel tank.

It will be understood that the spring force of the coil compression springs 98 and 84 can be adjusted to set threshold pressure at which the clutch mechanism 42 will engage and disengage. In addition, it will be understood that the diaphragm 70 is free to withdraw to its position of FIG. 2 even if the clutch teeth 52 of clutch plate 50 were to experience a tip-on-tip engagement with the clutch teeth 46. In addition, it is seen that the tips of the clutch teeth 46 and 52 are preferably pointed or slanted to facilitate the engagement of the clutch teeth 52 with the clutch teeth 46 in the event of a tip-on-tip engagement thereof.

Thus, it is seen that the invention provides a new and improved fuel cap for a motor vehicle in which a clutch mechanism is provided inside the fuel cap to prevent removal of the fuel cap until the pressure within the tank is reduced to be at or near the ambient atmospheric pressure.

Although the drawings herein show a particular embodiment for carrying out the invention, alternative structures are within the scope of the claims. For example, the drawings herein show the clutch plate movably mounted on the handle 12 and having clutch teeth moving into engagement with fixed clutch teeth provided on the body. As an alternative, the movable clutch plate could be mounted for up and down movement on the body 14, and the fixed gear teeth could be provided on the handle. In addition, although the drawings herein show the diaphragm 70 mounted on the body 14, the diaphragm 70 could be mounted within the handle 12, above the clutch plate, for pulling the clutch plate up and down between its engaged and disengaged positions.

What is claimed is:

1. A fuel cap for capping a filler neck on a fuel tank having fuel stored therein, said filler neck venting a volume of fuel vapor to the atmosphere when the cap is removed by a user, and the volume of fuel vapor escaping depending upon the difference between the fuel vapor pressure and the atmospheric pressure, comprising:

a cap body having threads for engaging and disengaging the filler neck when the cap body is rotated;

a cap handle rotatably mounted on the cap body; said cap handle having a window opening therein;

a first set of clutch teeth provided on the cap body;

a clutch plate mounted on the cap handle for up and down movement within the cap handle and rotation with the cap handle;

a pressure-sensing diaphragm of flexible material mounted within the cap body and having a first side of the diaphragm exposed to fuel vapor pressure and a second side of the diaphragm exposed to atmospheric pressure, said pressure-sensing diaphragm being operably coupled to the clutch plate for moving the clutch plate up and down within the cap handle;

a second set of clutch teeth provided on the clutch plate for engaging and disengaging with the first set of clutch teeth provided on the cap body so that rotation of the cap handle will be either effective or ineffective to rotate the cap body depending upon the pressure differential sensed by the pressure-sensing diaphragm;

said clutch plate having a post thereon that engages with the cap handle to limit the upward movement of the clutch plate when the second set of clutch teeth provided on the clutch plate are disengaged from the first set of clutch teeth provided on the cap body;

and said post that engages with the cap handle having an indicator surface thereon that is visible to the user through the window opening provided in the cap handle to indicate that the second set of clutch teeth is not engaged with the first set of clutch teeth so that the user is informed that turning the handle will not rotate the cap body unless an implement is inserted through the window opening to manually engage the second set of clutch teeth provided on the clutch plate with the first set of clutch teeth provided on the cap body irrespective of the pressure differential between the fuel vapor pressure and the atmospheric pressure.

\* \* \* \* \*